Aug. 7, 1956  J. B. KUCERA  2,757,800
STRAINER DEVICE
Filed Jan. 23, 1953
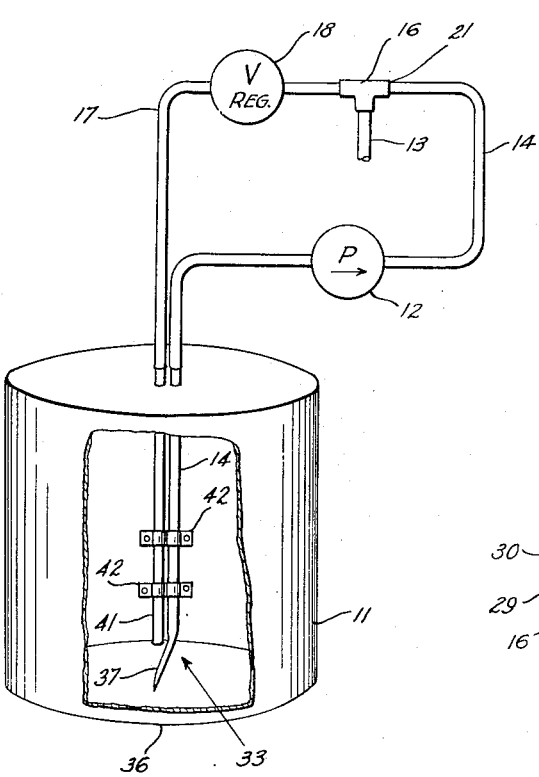
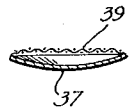
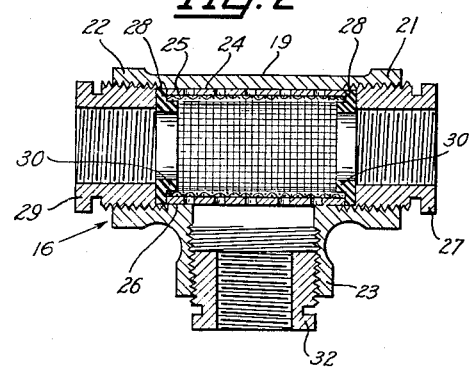
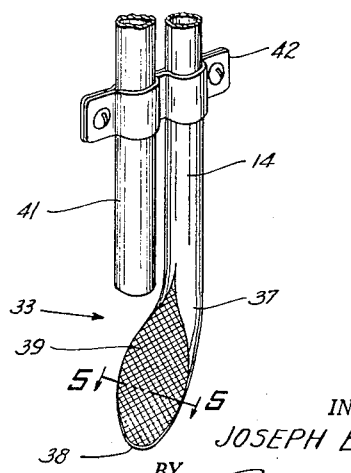
INVENTOR.
JOSEPH B. KUCERA
BY
ATTORNEY.

United States Patent Office 2,757,800
Patented Aug. 7, 1956

2,757,800

STRAINER DEVICE

Joseph B. Kucera, Traer, Iowa

Application January 23, 1953, Serial No. 332,961

2 Claims. (Cl. 210—152)

This invention relates generally to straining devices and more particularly to a self-cleaning straining device for use in fluid flow systems.

An object of this invention is to provide an improved self-cleaning strainer for use in fluid flow systems.

A further object of this invention is to provide a straining device capable of being interposed in a fluid flow system so as to direct a first portion of the fluid passing through the system through a strainer member and a second portion of the fluid in the system across the strainer member to continuously clean the strainer member.

Another object of this invention is to provide a fluid flow system having an inlet disposed in a source of fluid supply, and a straining device disposed on said inlet. A by-pass connection for discharging fluid back into said source of supply is arranged so as to direct fluid across the straining device to maintain the same clean.

A further object of this invention is to provide a straining device having an inlet connection, an outlet connection and a by-pass connection. A screen or strainer member is arranged to strain fluid passing from the inlet connection to the outlet connection concurrently with directing the fluid flow to the by-pass connection across the screen member to maintain the same clean.

Yet another object of this invention is to provide a self-cleaning straining device for a fluid discharge system which is simple and rugged in construction, economical to manufacture, and efficient in operation to continuously strain the fluid being discharged from the system.

Further objects, features and advantages of this invention will become apparent from a consideration of the following description when taken in connection with the accompanying drawing in which:

Fig. 1 is a diagrammatic view of a fluid flow system embodying a pair of the straining devices of this invention;

Fig. 2 is a longitudinal sectional view of one form of straining device used in the system illustrated in Fig. 1;

Fig. 3 is a perspective view of a perforated tubular member used in the straining device of Fig. 2;

Fig. 4 is a perspective view of the other from of straining device used in the system illustrated in Fig. 1; and Fig. 5 is a sectional view of the straining device of Fig. 4 looking along the line 5—5 in Fig. 4.

With reference to the drawing, a fluid flow system is illustrated in Fig. 1 having a supply tank 11 and a pump 12 for pumping fluid from the tank 11 to an outlet or discharge line 13. The pump 12 is connected in a fluid supply line 14 extended between the supply tank 11 and a straining device 16 to which the outlet line 13 is connected. A by-pass fluid line 17, which includes a pressure regulating valve 18, extends from the straining device 16 back into the supply tank 11.

The straining device 16 (Fig. 2) includes a T-shape pipe fitting having a body member or casing 19 formed with a threaded inlet 21, a threaded by-pass connection 22 disposed opposite the inlet 21, and a threaded outlet 23 arranged between and at a substantially right angle relative to the inlet 21 and by-pass connection 22. Positioned longitudinally of and within the body member 19 so as to be aligned with the inlet 21 and the by-pass connection 22 is a hollow cylindrical strainer unit 24 of a length to extend between the inlet 21 and by-pass connection 22 and across the outlet 23. The unit 24 includes a perforated tube 26 within which there is inserted a tubular screen member 25 of a diameter substantially equal to the inner diameter of the tube 26 and corresponding in length to the tube 26.

Arranged in the body member 19 in contact with the opposite ends of the strainer unit 24 are a pair of resilient spacers or washers 28 provided with inwardly directed annular extensions 30. These extensions 30 are of a diameter corresponding substantially to the diameter of the tubular screen 25 and are arranged within the opposite ends of the screen to maintain the screen 25 in contact with the inner surface of the perforated tube 24. A pipe reducer 27 is threaded in the inlet 21 and a similar pipe reducer 29 is threaded in the by-pass connection 22 with the reducers 27 and 29 being advanced into contact with the washers 28. Thus, the unit 24 is securely held within the body member 19 between the reducers 27 and 29. The reducer 27 is internally threaded for connection to the fluid line 14 and the reducer 29 is similarly threaded for connection to the by-pass fluid line 17. A similarly internally threaded pipe reducer 32 is threaded in the outlet 23 for connection to the outlet or discharge line 13.

In the operation of the fluid flow system with the straining device 16, the pump 12 is operated to pump fluid from the supply tank 11 through the fluid supply line 14. This fluid in the line 14 enters the straining device 16 through the inlet 21 and flows out of the device 16 through the by-pass connection 22 and the outlet 23. By virtue of the regulating valve 18 being disposed in the by-pass line 17, the major portion of the fluid entering the straining device 16 flows out through the outlet 23, with the valve 18 permitting only a relatively small flow of fluid through the passage 17. To accomplish this result the pressure regulating valve 18 is adjusted in accordance with the pressure created in the system by the pump 12. For example, if the pressure in the system created by the pump 12 is about 110 pounds per square inch, the regulating valve 18 is adjusted for a pressure of about 100 pounds per square inch so that only a small flow of fluid is permitted through the valve 18.

Thus, since only a small amount of fluid entering the straining device 16 is permitted to flow out through the by-pass connection 22, the majority of the fluid passes through the outlet 23 into the outlet line 13. However, this fluid which passes through the outlet 23 must first flow through the screen 25 and the perforations in the tube 26 so that any solid particles in the fluid are strained by the screen 25 so as to remain on the inside of the screen. These impurities are washed off the inside of the screen 25 by the fluid which is continuously flowing out the by-pass connection 22, with this fluid functioning to carry these screenings back to the supply tank 11. It can thus be seen that the fluid which passes through the by-pass connection 22 operates to continually flush the screen 25 so as to maintain the screen 25 clean for efficient straining of the fluid in the system.

For preventing the inlet end of the supply line 14 from being clogged by settlings or solid particles in the tank 11 and further for reducing the straining required of the straining device 16, an auxiliary straining device 33 may be provided in the supply tank 11. The straining device 33 includes an inclined inlet section 37 (Fig. 4) formed at the inlet end 38 of the fluid supply line 14 adjacent the bottom 36 of the supply tank 11. The section 37 is generally spoon shaped and is formed by cutting the inlet end of the fluid line 14 along the top side thereof and progressively spreading the cut portion of the line 14 toward its inlet end 38 and then forming such end into a spoon shape. A substantially flat fine mesh screen member 39 is then secured across the open top side of the spoon shaped inlet section 37.

Within the supply tank 11, the portion of the line 14 extended upwardly from the upper end of the inclined inlet section 37, is arranged in a parallel spaced relation with a downwardly directed outlet section 41 formed at the lower end of the by-pass line 17. The supply line 14 and the outlet section 41 are maintained in a parallel spaced relation by a pair of vertically spaced clamps 42. The outlet section 41 terminates at its lower end above the upper portion of the inclined inlet section 37 so that fluid discharged from the section 41 is directed against and across the screen 39 on the section 37. This fluid which is directed across the screen 39 functions to wash solid particles on the outer surface of the screen 39 off the screen and back into the tank 11 so as to maintain the screen 39 clean. It can thus be seen that the inclined section 37 constitutes a body member for carrying the screen 39 through which the fluid is strained.

In the operation of a fluid flow system which includes both the straining devices 16 and 33, the straining device 33 functions to strain the fluid which is drawn into the supply line 14 by the pump 12. Thus, some of the solid particles or settlings in the tank 11 are prevented from entering the pump and supply line 14, and those solid particles which pass through the screen 39 are strained out by the straining device 16. Thus as a result of the straining device 33 functioning to prevent solid particles from entering the supply line 14, the life of the pump 12 is prolonged. It is to be understood of course that the relative sizes of the openings in the screens 25 and 39 may be such that different size solid particles are strained out by the screens so as to equalize the straining action required of the screens 25 and 39.

The straining devices 16 and 33 are useful in a variety of systems but are particularly useful in connection with farm spraying equipment used to spray crops. In such use, the tank 11 is mounted on a farm tractor and the outlet line 13 which is extended from the straining device 16 is connected to the discharge nozzles for the spraying equipment. As is well known, in such farm use the fluid in the supply tank 11 often includes a variety of solid material, which, if not strained out clogs the discharge spraying nozzles so as to render the spraying operation ineffective. Such solid material includes the particles which precipitate out of the spraying fluid, rust in the tank 11, and dirt which enters the tank 11 during filling of the tank. It can thus be seen, that the straining devices 16 and 33, which are continually washed and maintained clean, are effective to clean the fluid in such systems and thus prevent the screens 25 and 39 as well as the discharge spraying nozzles from becoming clogged.

It is apparent also that the tubular perforated member 25 may be of a reduced diameter relative to the washers 28 so as to be in a concentrically spaced relation within the body member 19, whereby fluid may be strained about the entire peripheral surface of the screen 25, for flow into such space and then outwardly from the body member 19 through the outlet connection 23.

Although the invention has been described with respect to a preferred embodiment thereof, it is to be understood that it is not to be so limited since changes can be made therein which are within the full intended scope of the appended claims.

I claim:

1. In a fluid flow system, a fluid supply reservoir, a strainer device comprising a body member having an inlet connection and an outlet connection arranged at an angle relative to said inlet connection, a fluid supply line for said inlet connection, said supply line having the inlet end thereof positioned within said reservoir, a screen member extended across the inlet end of said fluid supply line, a by-pass connection on said body member arranged substantially opposite said inlet connection, fluid passage means connected to said by-pass connection, said passage means having an outlet end positioned within said fluid reservoir at a position adjacent and at an angle relative to said screen member, means in said system providing for a decreased flow of fluid in said fluid passage means from said strainer device to said reservoir relative to the flow of fluid in said supply line, and screening means in said body member arranged so that a portion of the fluid from said supply line flows through said inlet connection to said outlet connection through said screening means and a second portion of said fluid flows across said screening means to said by-pass connection, whereby said second portion of fluid is discharged from said outlet end against and across said screen member to continuously clean the screen member.

2. For use in a fluid flow system which includes a fluid supply reservoir, a fluid supply line having the inlet end thereof positioned within said reservoir, said inlet end having an inlet opening of an enlarged size relative to said supply line, a substantially flat screen member positioned on said inlet end and extended across said opening, fluid passage means having an outlet end arranged within said reservoir at an angle relative to said screen member so that fluid discharged from said outlet end is directed against and across said screen member to wash solid particles therefrom.

References Cited in the file of this patent

UNITED STATES PATENTS

| 249,172 | Grinnell | Nov. 8, 1881 |
| 1,745,005 | Buckner | Jan. 28, 1930 |
| 2,090,637 | Paige | Aug. 24, 1937 |
| 2,454,259 | Shadday | Nov. 16, 1948 |
| 2,463,814 | Skinner | Mar. 8, 1949 |
| 2,513,781 | Berggren | July 4, 1950 |
| 2,552,493 | Newton | May 8, 1951 |
| 2,583,522 | Winslow et al. | Jan. 22, 1952 |
| 2,608,952 | Herbert | Sept. 2, 1952 |
| 2,678,733 | Reeves | May 18, 1954 |

FOREIGN PATENTS

| 736,742 | France | Nov. 28, 1932 |